(12) United States Patent
Burkett et al.

(10) Patent No.: US 9,445,625 B2
(45) Date of Patent: Sep. 20, 2016

(54) HOLDING CABINETS, METHODS FOR CONTROLLING ENVIRONMENTAL CONDITIONS IN HOLDING CABINETS, AND COMPUTER-READABLE MEDIA STORING INSTRUCTIONS FOR IMPLEMENTING SUCH METHODS

(71) Applicant: Henny Penny Corporation, Eaton, OH (US)

(72) Inventors: Douglas A. Burkett, Eaton, OH (US); Manouchehr Shirali, Eaton, OH (US)

(73) Assignee: Henny Penny Corporation, Eaton, OH (US)

( * ) Notice: Subject to any disclaimer, the term of this patent is extended or adjusted under 35 U.S.C. 154(b) by 0 days.

(21) Appl. No.: 14/410,986

(22) PCT Filed: Apr. 24, 2014

(86) PCT No.: PCT/US2014/035252
§ 371 (c)(1),
(2) Date: Dec. 23, 2014

(87) PCT Pub. No.: WO2015/130329
PCT Pub. Date: Sep. 3, 2015

(65) Prior Publication Data
US 2015/0237908 A1    Aug. 27, 2015

Related U.S. Application Data

(60) Provisional application No. 61/945,069, filed on Feb. 26, 2014.

(51) Int. Cl.
*A23L 3/00* (2006.01)
*A23L 3/3418* (2006.01)
*A23L 3/005* (2006.01)

(52) U.S. Cl.
CPC .............. *A23L 3/3418* (2013.01); *A23L 3/005* (2013.01)

(58) Field of Classification Search
CPC ..... A23L 3/003; A23L 3/001; A23L 3/3418; A23L 3/005; A23V 2002/00
See application file for complete search history.

(56) References Cited

U.S. PATENT DOCUMENTS 5,165,243 A     11/1992 Bennett
5,179,265 A *    1/1993 Sheridan ................ A21B 1/245
                                                                219/388

(Continued)

FOREIGN PATENT DOCUMENTS

WO         2012/112704 A2     8/2012
WO     WO 2012112704 A2 *    8/2012

OTHER PUBLICATIONS

United States Patent and Trademark Office, International Search Report and Written Opinion for International Application No. PCT/US2014/035252, dated Sep. 4, 2014.

(Continued)

*Primary Examiner* — Allen Flanigan
*Assistant Examiner* — Kun Kai Ma
(74) *Attorney, Agent, or Firm* — Baker Botts L.L.P.

(57) ABSTRACT

A holding cabinet includes a body defining a holding space and a holding compartment disposed within the holding space for holding a product therein. The holding cabinet further includes a heating source, a steam generator, a temperature sensor, a humidity sensor, a product detector, and a controller. The controller is configured to regulate environmental conditions of the holding compartment according to a determined setpoint, which corresponds to a predetermined temperature and relative humidity. The controller regulates such environmental conditions by acquiring the sensed air temperature, relative humidity, and the detected type of product, and activating and deactivating the heating source and the steam generator in accordance with the acquired air temperature, relative humidity, and the determined setpoint corresponding to the type of product detected and a holding time of the product, to maintain the air temperature and the relative humidity within a predetermined range based on the determined setpoint.

21 Claims, 11 Drawing Sheets

(56) References Cited

U.S. PATENT DOCUMENTS

| | | | |
|---|---|---|---|
| 5,598,971 A | 2/1997 | Winther | |
| 6,011,242 A * | 1/2000 | Westerberg | A47J 27/62 219/411 |
| 6,772,752 B1 * | 8/2004 | Boyer | 126/21 A |
| 6,832,732 B2 | 12/2004 | Burkett | |
| 2003/0047553 A1 * | 3/2003 | Patti et al. | 219/400 |
| 2003/0116636 A1 | 6/2003 | Burkett et al. | |
| 2005/0236402 A1 * | 10/2005 | Christiaansen et al. | 219/681 |
| 2007/0102418 A1 * | 5/2007 | Swank et al. | 219/400 |
| 2007/0251397 A1 * | 11/2007 | Dorsten et al. | 99/407 |
| 2010/0015313 A1 * | 1/2010 | Harris | 426/523 |
| 2011/0215091 A1 * | 9/2011 | Stanger | H05B 6/6479 219/682 |
| 2011/0232312 A1 | 9/2011 | Bortoletto | |
| 2011/0283895 A1 * | 11/2011 | Veltrop | 99/451 |
| 2012/0180775 A1 * | 7/2012 | Waltz | A21B 1/245 126/15 R |
| 2013/0174746 A1 | 7/2013 | Bach | |
| 2014/0110390 A1 * | 4/2014 | Wu | F26B 3/30 219/395 |

OTHER PUBLICATIONS

United States Patent and Trademark Office, International Search Report, Written Opinion, and Search History for International Application No. PCT/US2014/053795, dated Dec. 24, 2014.

* cited by examiner

HOLDING CABINETS, METHODS FOR CONTROLLING ENVIRONMENTAL CONDITIONS IN HOLDING CABINETS, AND COMPUTER-READABLE MEDIA STORING INSTRUCTIONS FOR IMPLEMENTING SUCH METHODS

CROSS-REFERENCE TO RELATED APPLICATIONS

This application is a U.S. National Stage Patent Application under 37 U.S.C. 371 of International Patent Application No. PCT/US14/35252, filed on Apr. 24, 2014, which claims priority to U.S. Provisional Patent Application Ser. No. 61/945,069, filed Feb. 26, 2014, which is incorporated by reference herein in its entirety.

BACKGROUND OF THE INVENTION

1. Field of the Invention

The present invention relates to a holding cabinet, which provides a more consistent and accurate holding environment for food products. In particular, the invention relates to a holding cabinet, which provides a more consistent and accurate holding environment for food products by providing control of environmental conditions within the cabinet.

2. Description of Related Art

There is a demand for food holding devices that maintain food products at a substantially uniform temperature for selected periods of time while preserving the taste, moisture content, texture and quality of the food. Further, in other applications, it is desirable to be able to restore food products to acceptable quality after long storage periods.

Holding cabinets for cooked food products provide an environment in which certain environmental variables may be controlled to some degree. For example, air temperature may be controlled to a particular temperature level in an attempt to maintain the food product in a just-cooked state until it is served. These variables affect the quality of the food products. Several food product parameters are important to maintain food product quality. These product parameters include temperature, moisture content, color and texture. Texture is a complex combination of olfactory and gustatory sensations, which in turn are created by the mechanical and chemical properties of the food being held.

The initial food product parameters described above are primarily determined by the food product composition and the cooking process, but during holding, they are changed by the holding environment parameters. Exemplary environment parameters include air temperature, relative humidity, and airflow. Airflow can be considered as the mean speed at which air moves over the food product. Other environment parameters include heat conducted into the food product and radiant energy applied to the food product.

Previously, various methods and devices have been developed to attempt to maintain heat and humidity. These devices and methods, however, suffer from drawbacks such as high airflow and inaccurate temperature and humidity control. High airflow levels are detrimental to food quality over long periods. The airflow increases evaporative cooling from the food product, which causes the food product to cool excessively as well as reducing the moisture content below an acceptable level. Current holding cabinets may give acceptable results for short holding times, if the proper holding parameters are established and the cabinet can maintain the parameters within acceptable limits. Nevertheless, environmental parameters are not well controlled and holding times are limited before the quality of food products deteriorates below an acceptable level. More particularly, it has been found that air circulation characteristics and improper storage temperature contribute significantly to bacteria growth and excessive loss of moisture which leads to food shrinkage, so that in an improper storage atmosphere, the food deteriorates after only a short period of time and loses its tenderness, appetizing taste, and appearance. It has also been found that even where food is stored under favorable conditions in an enclosure, the food deteriorates at a rate dependent on the time the door to the enclosure is opened, exposing the storage chamber to the ambient atmosphere.

Additionally, it is known that in storage of some foods, such as fried chicken or fish, where a crust is provided, it is particularly desirable to maintain the crispness of the crust while minimizing the moisture loss from the underlying meat. Storage of such foods tends to involve the satisfaction of seemingly mutually exclusive conditions, to hold the crispness of the crust by maintaining low moisture content in the crust while minimizing moisture loss from the food. In such foods, excessive moisture-loss results in shrinkage and loss of tenderness and adversely affects the texture of the meat. This may be prevented by controlling the temperature and humidity of the storage atmosphere. The problem is preventing moisture flow from the underlying food to the crust while holding the crust in low moisture content.

SUMMARY OF THE INVENTION

Therefore, a need has arisen for holding cabinets for attaining environmental control by means of one or more environmental sensors and one or more controllers configured to adjust environmental conditions within such holding cabinets based on readings from the one or more environmental sensors. Consequently, in particular configurations of cabinets disclosed herein, such cabinets may comprise one or more of a temperature sensor, a humidity sensor, and airflow sensor, and the control systems of such cabinets may utilize the readings from such sensors to adjust one or more of the temperature within a cabinet chamber, the humidity within the cabinet chamber, and the flow of air within the cabinet chamber (e.g., environmental conditions within the cabinet), such that the environmental conditions within the cabinet extend the holding time for food products stored within the cabinet chamber before significant degradation in quality of the food products occurs (e.g., noticeable changes in taste, texture, or tenderness, or significant bacterial growth). Accordingly, such cabinets may implement a feedback loop to ensure that the environmental conditions within the cabinet are maintained within a predetermined range. Such a predetermined range may be a particular combination of environmental conditions (e.g., temperature, humidity, and airflow) that extends the holding time for food products, before significant degradation in quality occurs, compared to other combinations of the environmental conditions.

Moreover, different food products may possess different material properties. Therefore, a further need has arisen to maintain the environmental conditions within the cabinet in a predetermined range, specific to a particular food product, such that the holding time of the particular food product, before the quality of the particular food product degrades significantly, is extended. Consequently, in certain configurations of cabinets disclosed herein, the control systems of such cabinets may store and implement different predetermined ranges of environmental conditions for different types of food products. Methods disclosed herein may be methods for maintaining environmental conditions in a cabinet. Computer-readable instructions to perform such methods may be stored on non-transitory, computer-readable media and implemented by one or more processors, e.g., CPU, ASIC, or the like. Further, a system comprising a processor and a memory storing such computer-readable instructions may implement such methods.

In an embodiment, a holding cabinet comprises a body defining a holding space and a holding compartment disposed within the holding space and configured to hold a product therein. The holding cabinet further comprises a heating source; a steam generator in atmospheric communication with the holding compartment and configured to generate steam; a temperature sensor disposed adjacent to the holding compartment and configured to measure an air temperature of the holding compartment; a humidity sensor disposed adjacent to the holding compartment and configured to measure a relative humidity of the holding compartment; a product detector configured to detect that a product is loaded in the holding compartment and to identify a type of the product; and a controller. The heating source comprises one or more of: a radiant heater disposed above the holding compartment, a conduction heater disposed below the holding compartment, and a convection heater disposed at an end of the holding compartment. The controller is configured to regulate environmental conditions of the holding compartment according to a determined setpoint, which corresponds to a predetermined temperature and relative humidity. The controller is configured to acquire the air temperature sensed by the temperature sensor, the relative humidity sensed by the humidity sensor, and the type of product detected by the product detector. In accordance with the acquired air temperature, the acquired relative humidity, and the determined setpoint corresponding to the type of product detected and a holding time of the product, the controller is further configured to activate and deactivate one or more of the radiant heater, the conduction heater, the convection heater, and the steam generator to maintain the air temperature and the relative humidity of the holding compartment within a predetermined range based on the determined setpoint.

In an embodiment, a method for regulating environmental conditions of a holding cabinet, comprises sensing an air temperature in the holding cabinet with a temperature sensor; sensing a relative humidity in the holding cabinet with a humidity sensor; and detecting a type of product in the holding cabinet with a product detector. According to a determined setpoint that corresponds to a predetermined temperature and relative humidity, the method also comprises activating and deactivating one or more of a radiant heater, a conduction heater, a convection heater, and a steam generator to maintain the air temperature and the relative humidity within a predetermined range based on the determined setpoint in accordance with the sensed air temperature, the sensed relative humidity, and the determined setpoint corresponding to the type of product detected and a holding time of the product.

In an embodiment, a computer readable program product stores instructions that, when executed by a processor, instruct the processor to perform processes comprising: sensing an air temperature in the holding cabinet with a temperature sensor; sensing a relative humidity in the holding cabinet with a humidity sensor; detecting a type of product in the holding cabinet with a product detector. According to a determined setpoint that corresponds to a predetermined temperature and relative humidity, the processes further comprise activating and deactivating one or more of a radiant heater, a conduction heater, a convection heater, and a steam generator to maintain the air temperature and the relative humidity within a predetermined range based on the determined setpoint in accordance with the sensed air temperature, the sensed relative humidity, and the determined setpoint corresponding to the type of product detected and a holding time of the product.

Other objects, features, and advantages of the present invention will be apparent to persons of ordinary skill in the art in view of the following detailed description of embodiments of the invention and the accompanying drawings.

BRIEF DESCRIPTION OF THE DRAWINGS

For a more complete understanding of the embodiments of the present invention, needs satisfied thereby, and the objects, features, and advantages thereof, reference now is made to the following description taken in connection with the accompanying drawings.

DETAILED DESCRIPTION OF EMBODIMENTS OF THE INVENTION

Exemplary embodiments disclosed herein may, for example, reduce waste and improve profits by extending the useable life of food. In particular configurations, methods and systems disclosed herein may optimize the holding variables, including holding temperature and relative humidity with controllable equipment.

Further, embodiments disclosed herein may allow for a plurality of set points (e.g., different temperatures, humidity values, and airflow rates) that may each correspond to a particular product type or category to be held in the cabinet (e.g., the inventors have determined that the life of different products may be extended, but such extensions may require different settings for each different food product). In addition, the invention disclosed herein may extend product quality for a longer time while product is being held in the cabinet.

Still further, in certain configurations, the invention disclosed herein may optimize the combination of the variables for better product quality. In addition, systems disclosed herein may quantify sensory attributes in a manner that permits fine tuning and adjustment of environmental conditions and extend the life of held food products.

Embodiments of the present invention, and their features and advantages, may be understood by referring to FIGS. 1-11, like numerals being used for corresponding parts in the various drawings. While process steps disclosed herein are described in an exemplary order, the invention is not so limited, and the process steps described herein may be performed in any order. Further, one or more of the process steps may be omitted in certain configurations.

Figure 1:
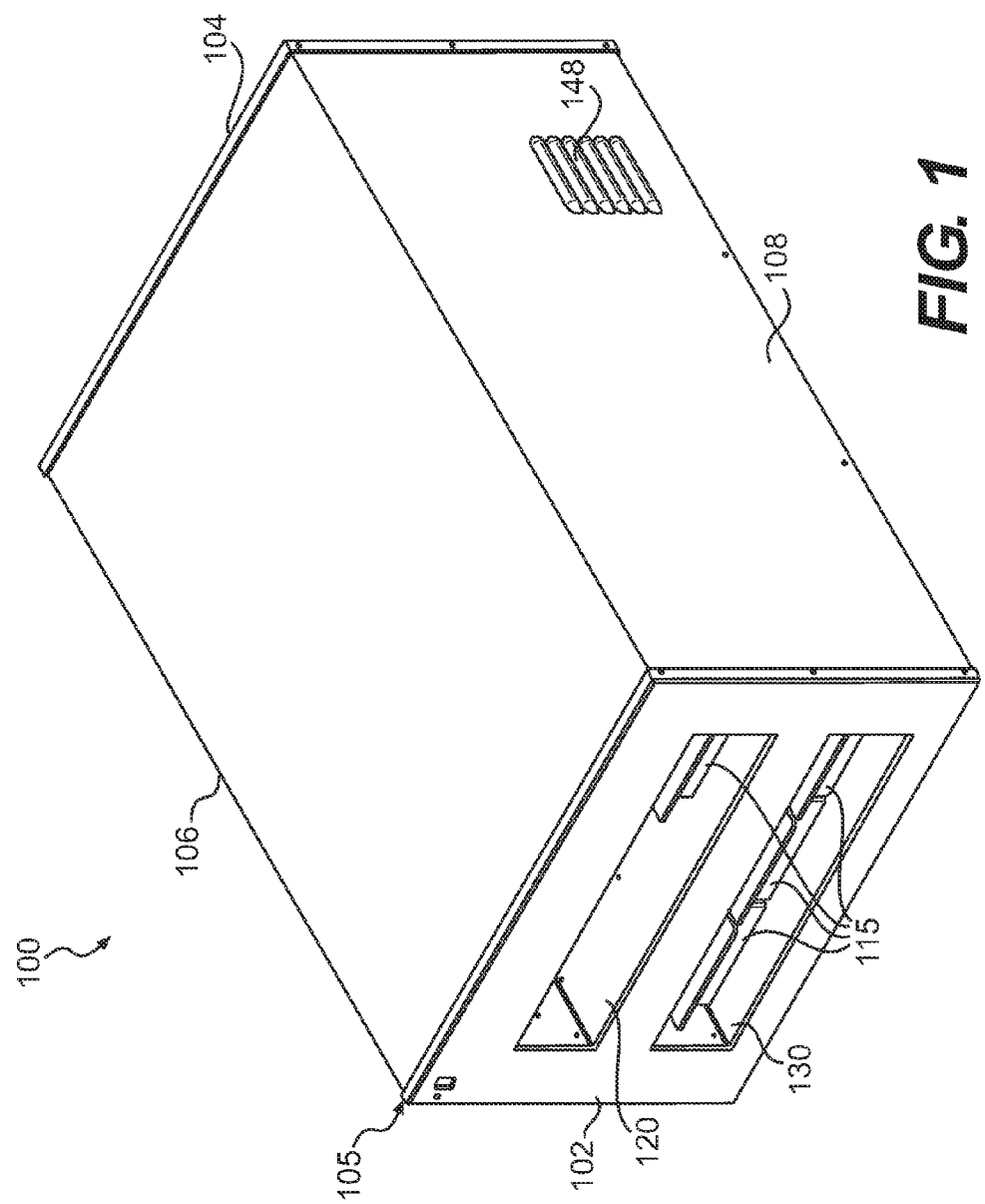
FIG. 1 depicts a perspective view of the holding cabinet according to an exemplary embodiment of the present invention.
Figure 2:
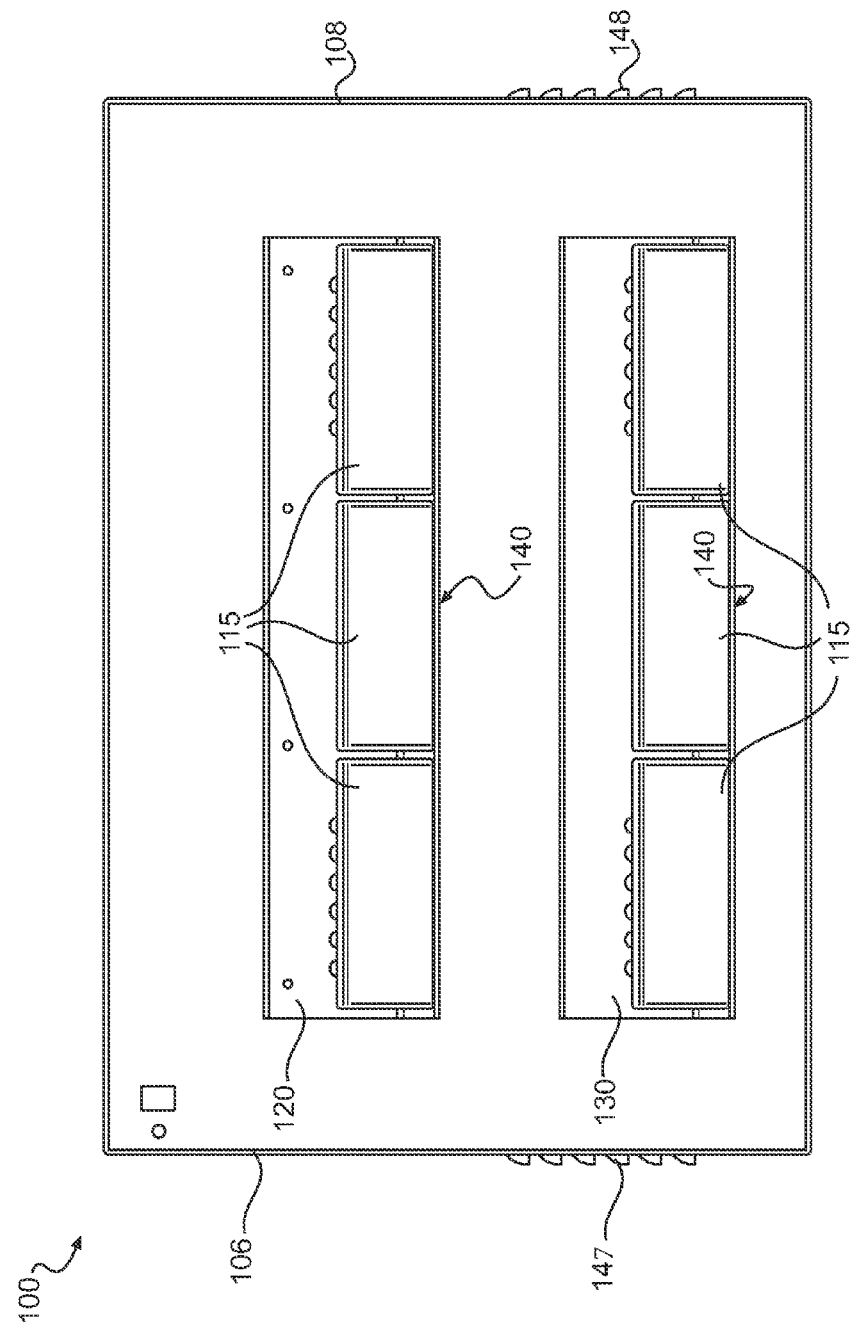
FIG. 2 depicts a front view of the holding cabinet according to an exemplary embodiment of the present invention.

Referring to FIGS. 1 and 2, a perspective view of the holding cabinet and a front view of the holding cabinet according to an exemplary embodiment of the present invention are provided, respectively. Holding cabinet 100 includes an enclosure 105 including a front 102, a back 104, and sides 106 and 108. Front 102 and back 104 may both have at least one door or may be open (i.e., a closed or open holding cabinet system). In the embodiment shown in FIGS. 1 and 2, front 102 is open and back 104 is closed.

FIG. 1 shows holding cabinet 100 with an upper holding compartment 120 and a lower holding compartment 130. In addition, four product holding trays 115 are shown inserted in a holding position. FIG. 1 shows three trays 115 in lower holding compartment 130 and one tray 115 in upper holding compartment 120. A side vent 148 is also shown on side 108 of holding cabinet 100 disposed near back 104. As shown in FIG. 2, a side vent 147 may be disposed on side 106 in a similar location as vent 148 positioned on side 108 (i.e., opposite to each other). Conduction heating elements 140 may be mounted to the lower surfaces of each of the upper holding compartment 120 and lower holding compartment 130. The heat generated from conduction heating elements 140 may be conducted from the heating element portions, through product holding tray 115, and to the food product held within product holding tray 115.

FIG. 2 shows six product holding trays 115 in a holding position within holding cabinet 100. Three product holding trays 115 may be disposed in upper holding compartment 120 and three product holding trays may be disposed in lower holding compartment 130. In alternative embodiments, each holding compartment may be configured to hold either more than or less than a maximum of three holding trays 115. Further, holding cabinet 100 may be configured to have either more than or less than two holding compartments.

Figure 3:
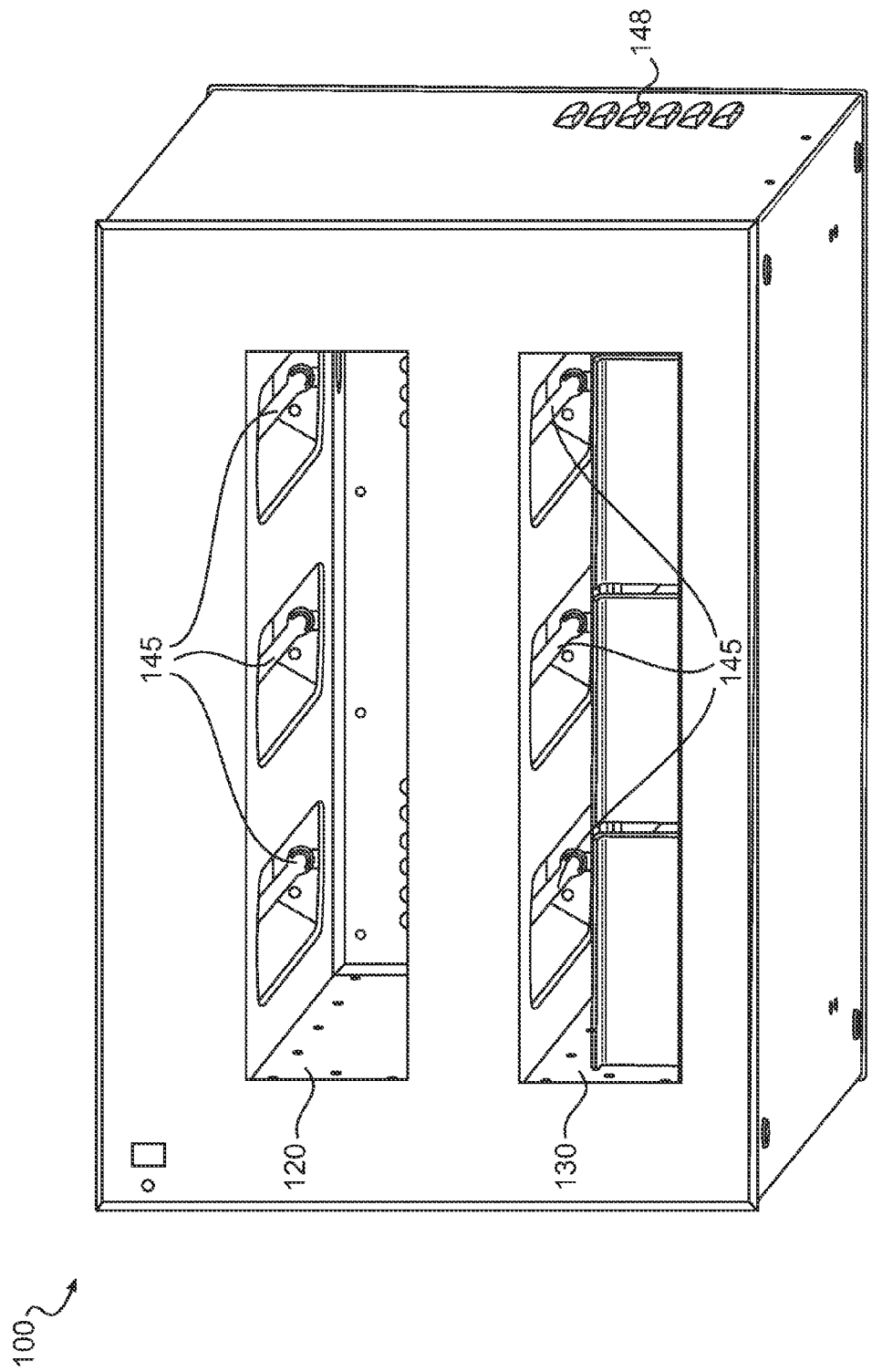
FIG. 3 depicts a front perspective view of the holding cabinet according to an exemplary embodiment of the present invention.

FIG. 3 shows a front perspective view of the holding cabinet according to an exemplary embodiment. Three product holding trays 115 are shown in lower holding compartment 130, with no trays shown in upper holding compartment 120. As shown in FIG. 3, radiant heaters 145 may be disposed above the positions of product holding trays 115 in each of upper holding compartment 120 and lower holding compartment 130. Thus, for example, a radiant heater 145 is disposed above respective positions where each product holding tray 115 is held in the holding position in holding cabinet 100. Alternatively, more than one radiant heater 145 is disposed above respective positions where each product holding tray 115 is held in the holding position in holding cabinet 100. Further, the number of radiant heaters 145 disposed above respective positions where each product holding tray 115 is held in the holding position may be uniform or non-uniform (i.e., each may have the same or a different number of radiant heaters 145).

Thus, radiant heaters 145 may be mounted to the upper interior surface of each of upper holding compartment 120 and lower holding compartment 130. Accordingly, radiant energy may be directed to the food product beneath the elements of radiant heaters 145 while held in holding cabinet 100.

Figure 4:
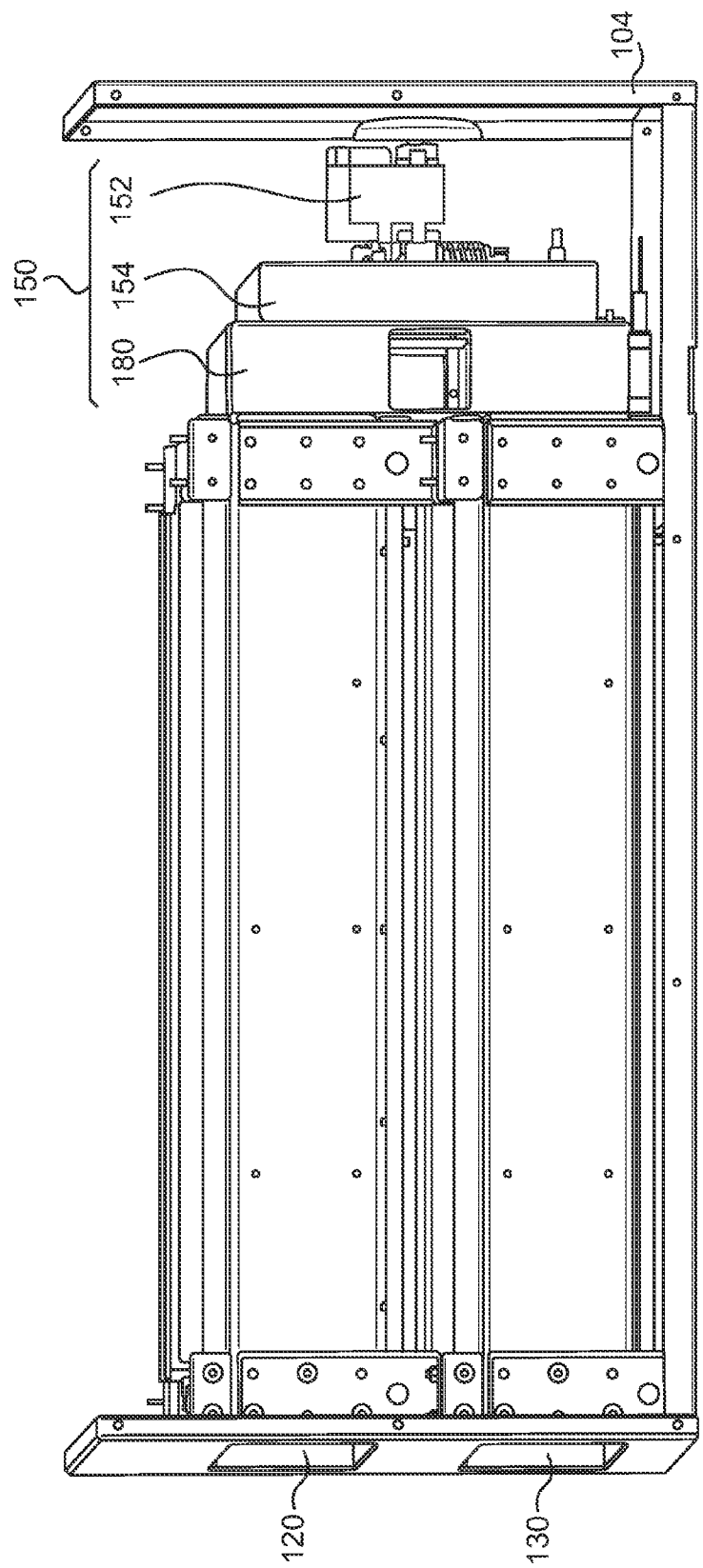
FIG. 4 depicts a cut-away side view of the holding cabinet according to an exemplary embodiment of the present invention.

FIG. 4 shows a cut-away side view of holding cabinet 100 according to an exemplary embodiment. A convection heater 150 is shown near back 104 side of holding cabinet 100. Convection heater 150 may include a convection blower motor 152, a convection heating element enclosure 154 enclosing a convection heating element 156 (shown in FIG. 7), and a convection heat mixing chamber 180. The convection heating system may include a single convection heating element 156 combined with a distribution fan or blower 157 driven by convection blower motor 152. The heated air may be distributed to each of the holding compartments of holding cabinet 100 through ducting channels. Fan or blower 157 also controls airflow through the holding compartments. Further, a venting system having vent openings (e.g., vents 147 and 148) may be provided, which may be operated to remove air from the holding compartments of holding cabinet 100.

Figure 5:
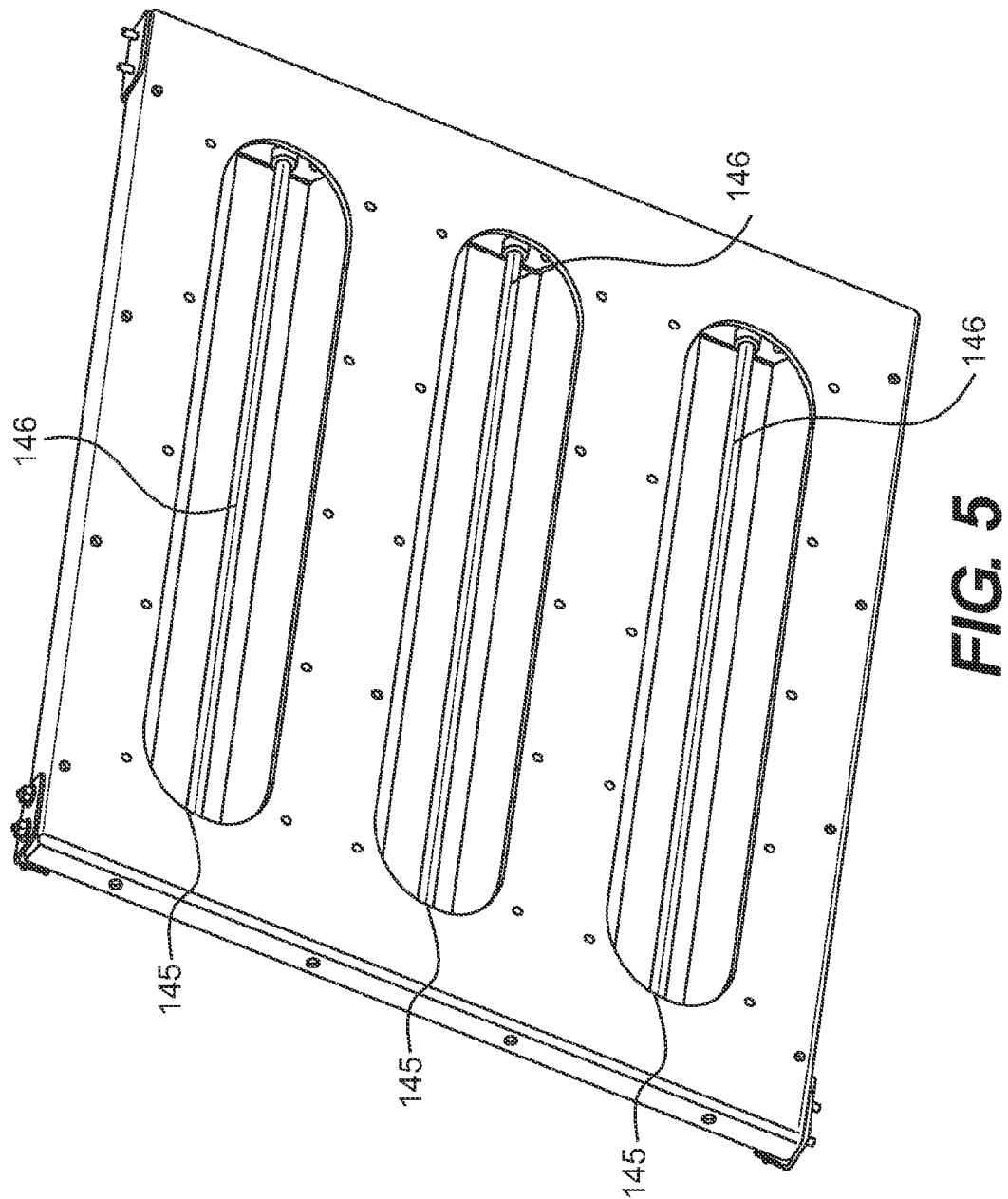
FIG. 5 depicts a radiant heater for the holding cabinet according to an exemplary embodiment of the present invention.

FIG. 5 shows radiant heaters 145 for one of the holding compartments of holding cabinet 100 according to an exemplary embodiment. Radiant heaters 145 may include radiant heating elements 146 that extend longitudinally in the front-to-back direction. The generated radiant heat may be directed downward through openings toward food product held in holding cabinet 100 to heat the food product.

Figure 6:
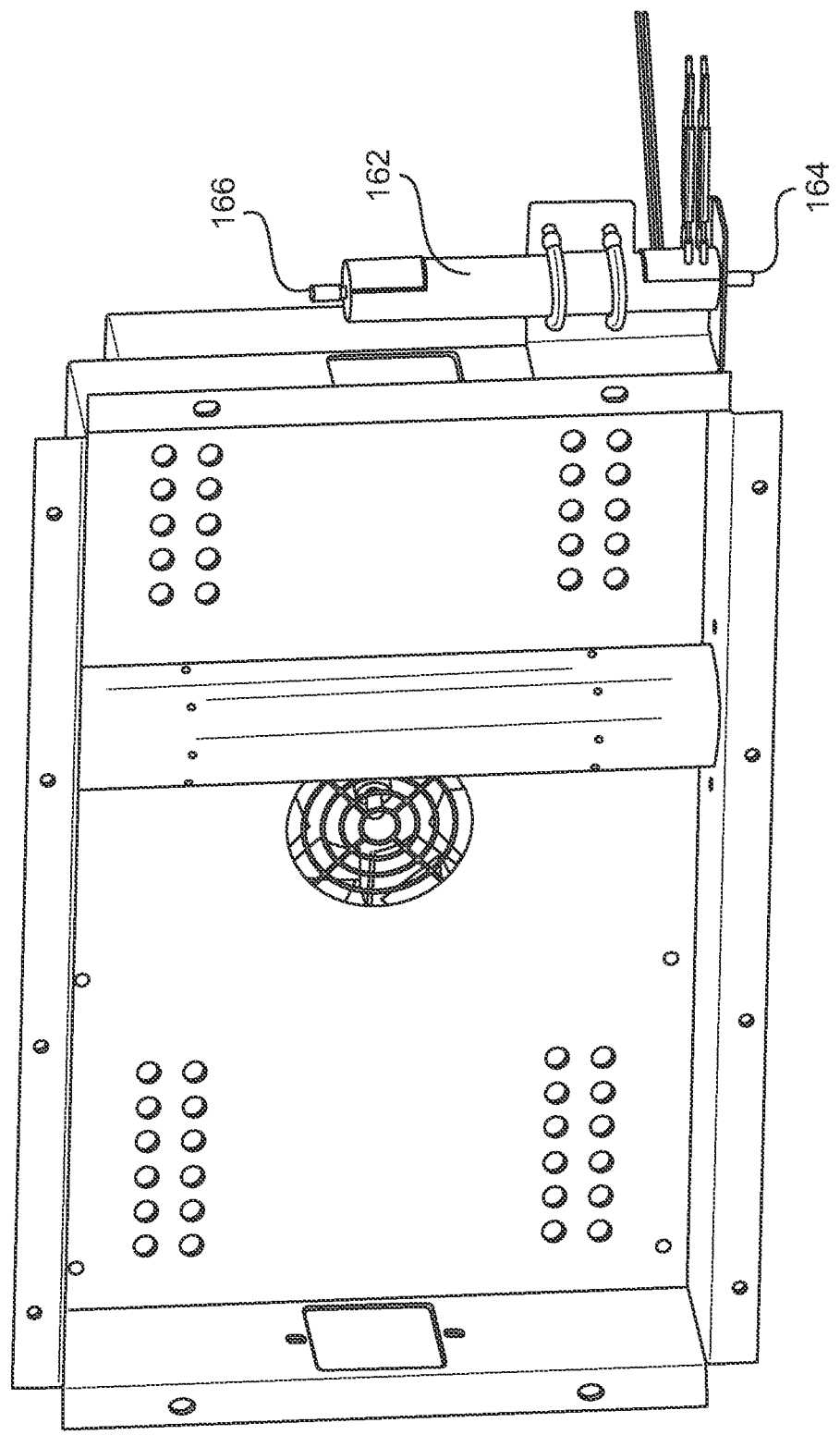
FIG. 6 depicts a cut-away view of the holding cabinet according to an exemplary embodiment of the present invention.

FIG. 6 shows a cut-away view of the holding cabinet according to an exemplary embodiment. A steam generation system 160 may be disposed on a side near back 104 of holding cabinet 100. Steam generation system 160 may include a steam generator 162, a water inlet 164, through which water enters steam generator 162 from a water source, and steam outlet 166, through which steam is emitted to a manifold or convection heat mixing chamber 180. In this manner, the humidity of the air in holding cabinet 100 may be increased and dynamically controlled. Other means of providing humidity, such as a mister, are also suitable for use with the present disclosure.

Figure 7:
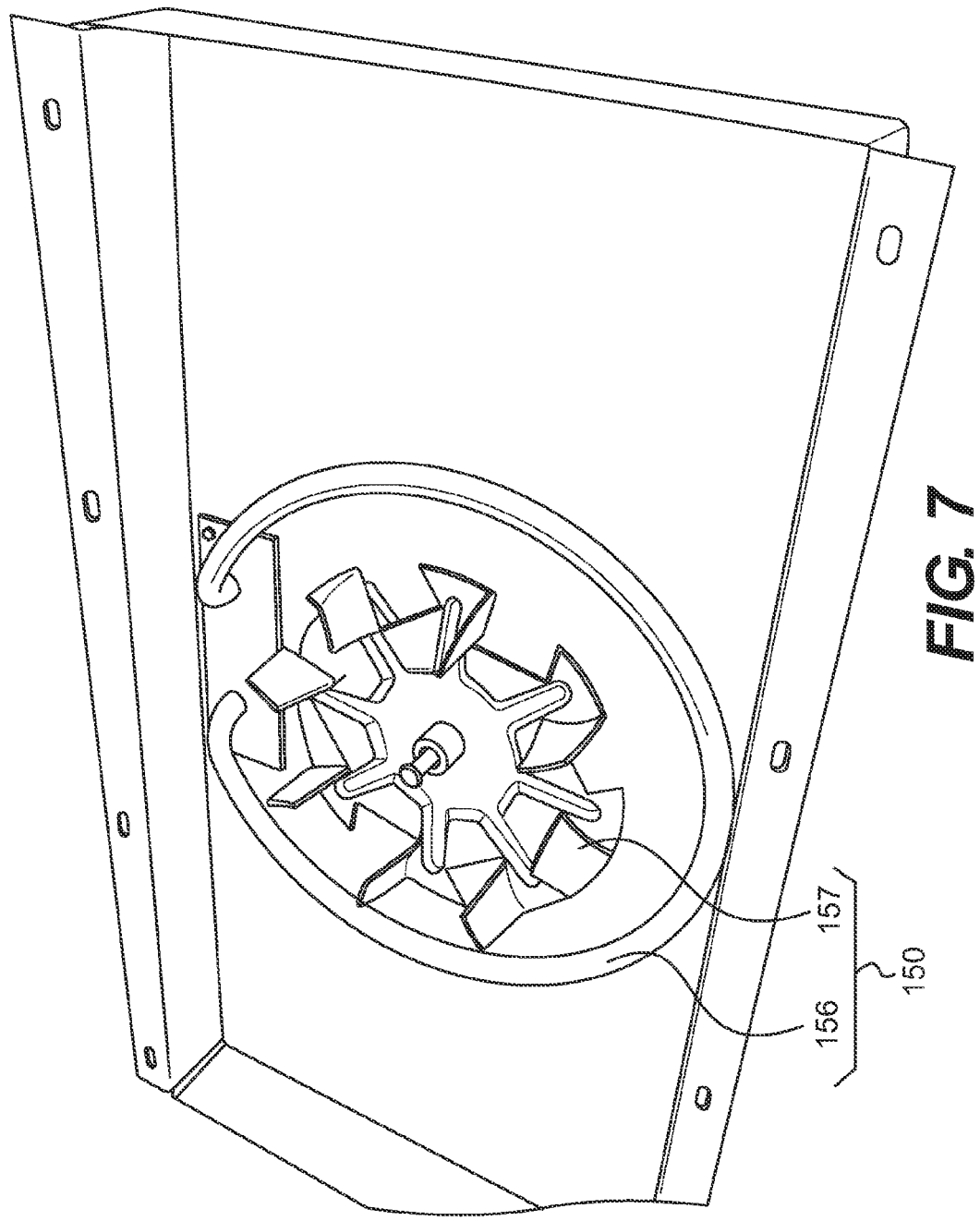
FIG. 7 depicts a convection heater for the holding cabinet according to an exemplary embodiment of the present invention.

FIG. 7 shows convection heater 150 for holding cabinet 100 according to an exemplary embodiment. Convection heater 150 may include a convection heating element 156 and a fan or blower 157. Convection heater 150 may be disposed on or near back 104 of holding cabinet 100. Fan or blower 157 may blow air heated by convection heating element 156 into the holding compartments of holding cabinet 100. Further, fan or blower 157 may be used to generally control airflow in holding cabinet 100.

Figure 8:
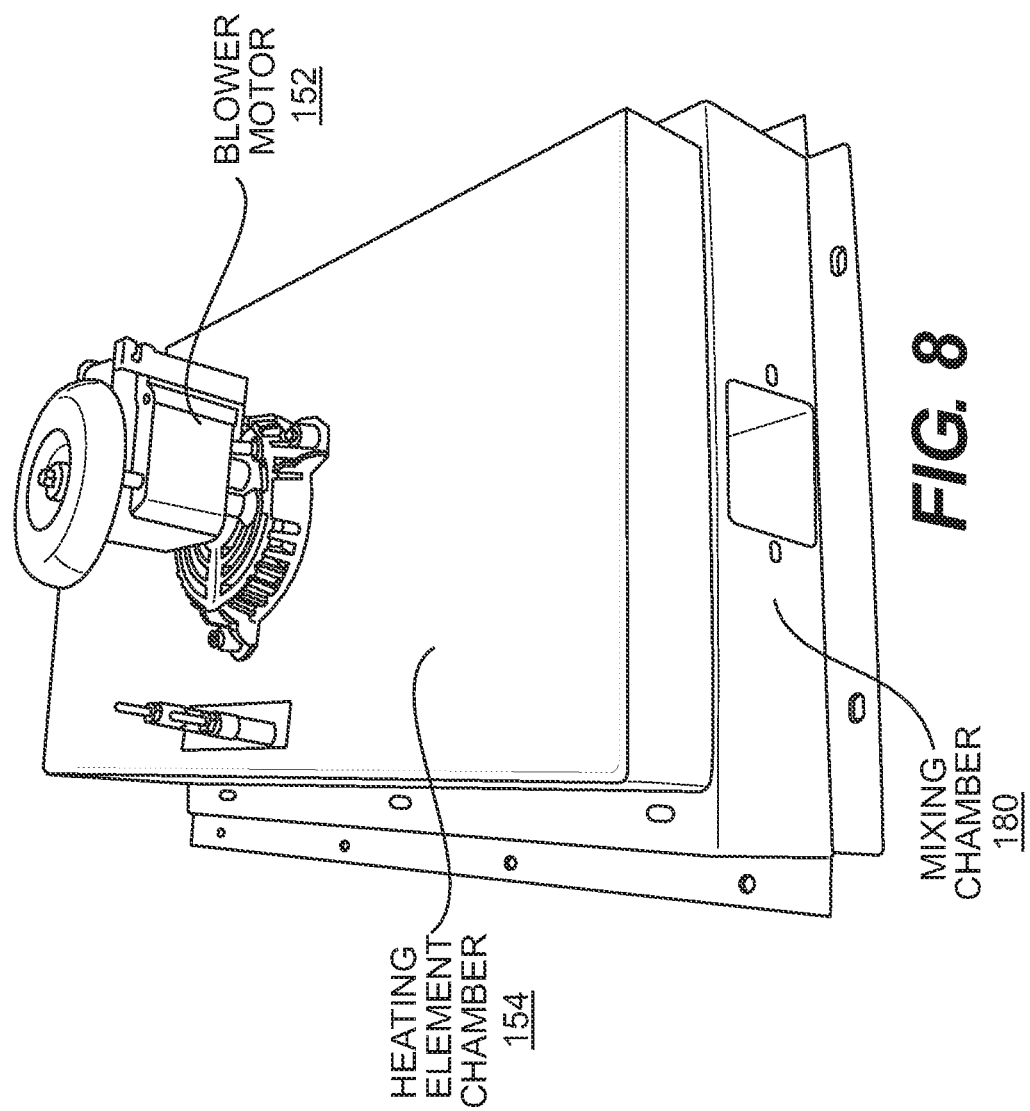
FIG. 8 depicts a partial view of the holding cabinet according to an exemplary embodiment of the present invention.

FIG. 8 shows a partial view of the holding cabinet according to an exemplary embodiment. In order, from back 104 towards front 102, holding cabinet 100 may include convection blower motor 152, convection heating element enclosure 154 enclosing a convection heating element 156, and convection heat mixing chamber 180. Convection blower motor 152 may be mounted on convection heating element enclosure 154, which is in atmospheric communication with convection heat mixing chamber 180.

Figure 9:
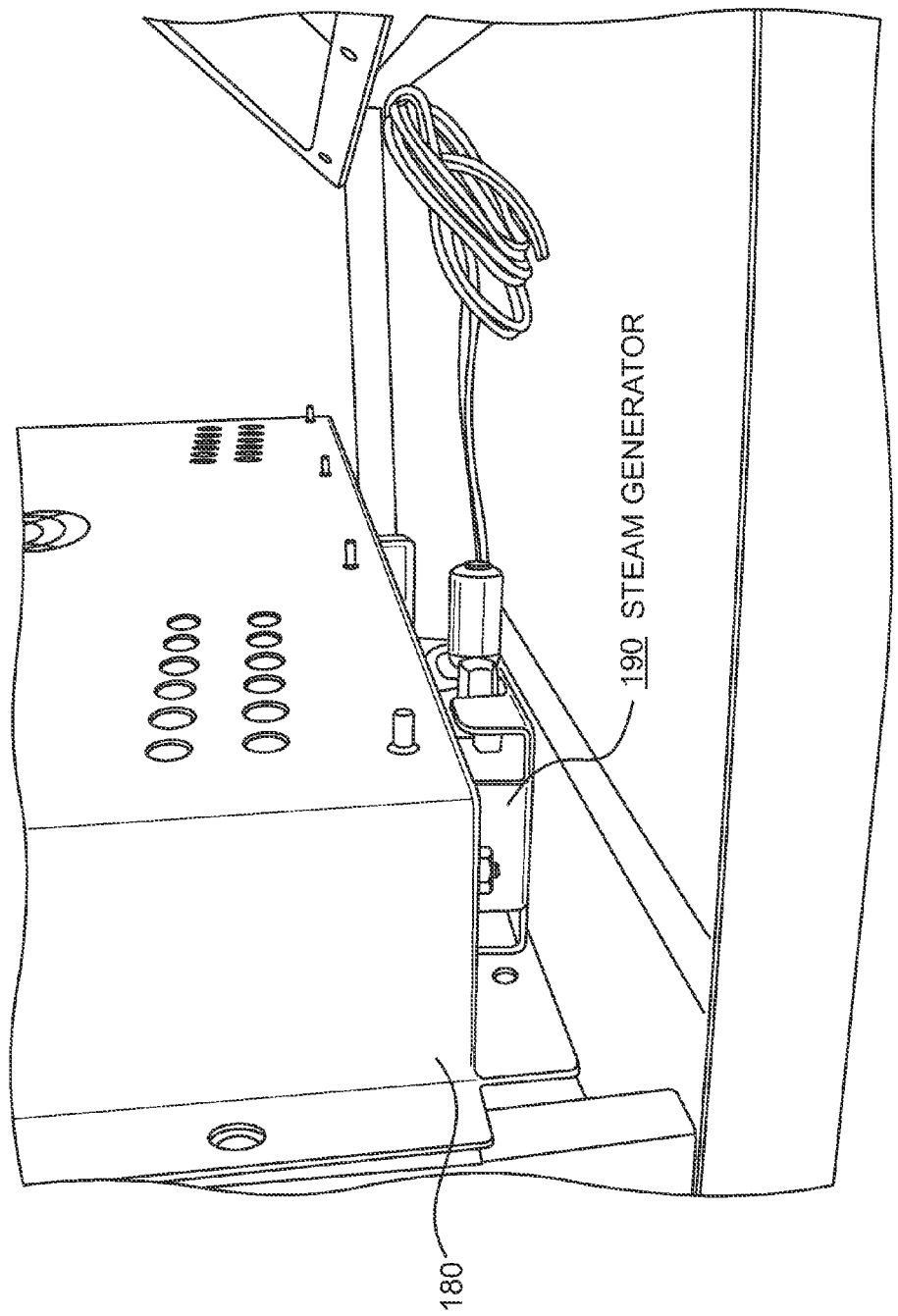
FIG. 9 depicts a partial view of the holding cabinet according to an exemplary embodiment of the present invention.

FIG. 9 shows a partial view of the holding cabinet according to an exemplary embodiment. As an alternative to steam generator 162 shown in FIG. 6, a "hot plate" type steam generator 190 may be provided in holding cabinet 100. Steam generator 190 may be mounted under or near the bottom of convection heat mixing chamber 180. Steam generator 190 introduces water into the air through a process of heating water stored in a reservoir to produce steam.

Figure 10:
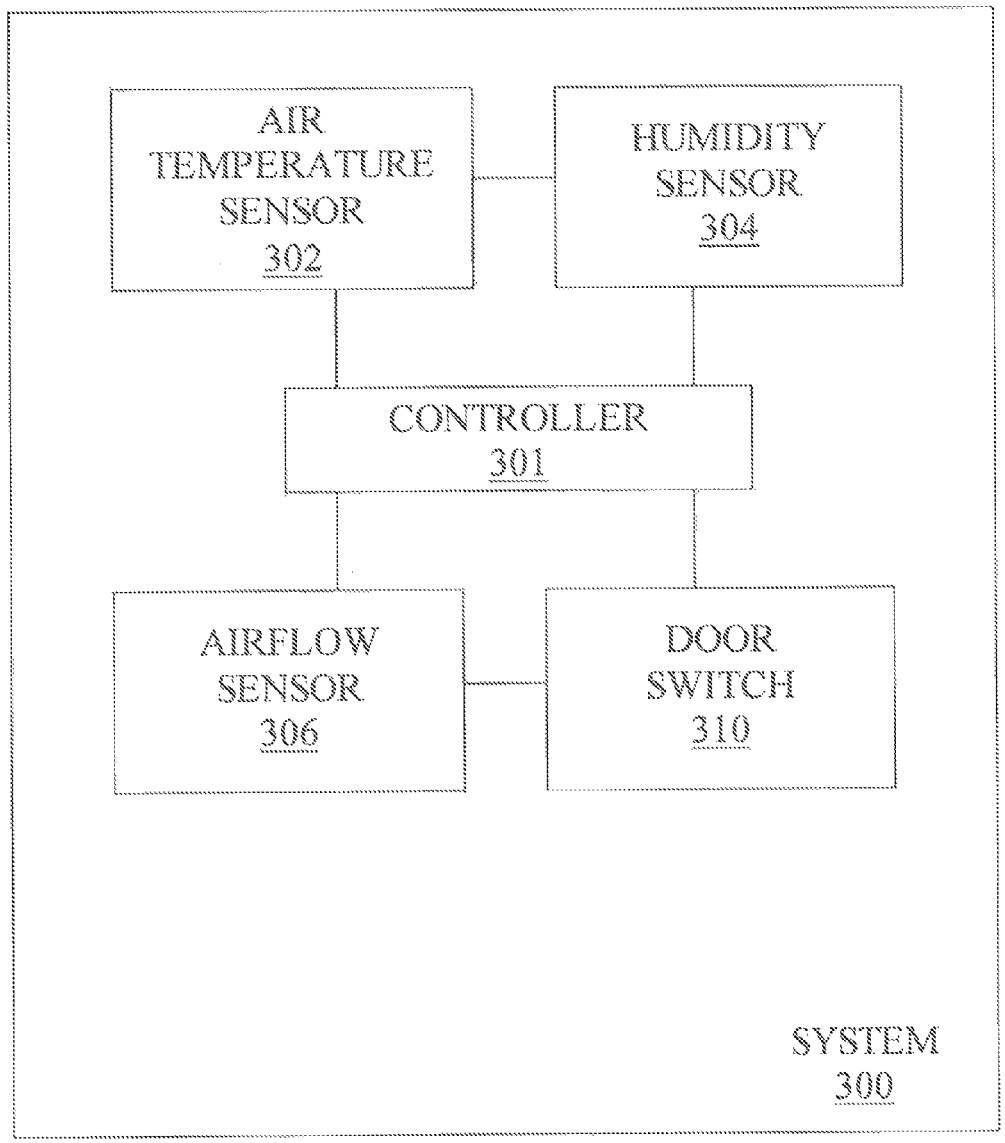
FIG. 10 depicts a block diagram of the holding cabinet control system according to an exemplary embodiment of the present invention.

FIG. 10 shows a block diagram of system 300 according to an exemplary embodiment. System 300 may include a controller 301. System 300 may include air temperature sensor 302 that measures the temperature of the air in the holding cabinet. Air temperature sensor 302 may also be used to provide temperature compensation for humidity sensor 304. Humidity sensor 304 may measure the relative humidity of the air in holding cabinet 100. One or more of conduction heating elements 140, radiant heaters 145, and convection heater 150 may heat the air in holding cabinet 100 to a specified set point corresponding to desired environmental conditions. Fan or blower 157 may circulate heated air through the cabinet to regulate temperature and/or air flow.

System 300 also may include at least one airflow sensor 306 that measures the rate of airflow in holding cabinet 100. Such an airflow sensor 306 may be disposed anywhere in holding cabinet 100, such as, for example, near or at an entry point where air is blown into the holding compartments, air temperature sensor 302, humidity sensor 304, a central location in holding cabinet 100, or any combination thereof. Further, a plurality of airflow sensors 306 may be disposed through the cabinet in order to determine an average rate of airflow.

System 300 may further include one or more door switches 310 disposed on or near a door or flap of a closed type of holding cabinet. Controller 301 may use input from door switch 310 to detect when a door is open and may energize the heating and/or steam generation systems to maintain the temperature and humidity at the desired set points.

The cabinet air temperature can be regulated with air temperature sensor 302, fan or blower 157, and one or more of conduction heating elements 140, radiant heaters 145, and convection heater 150. The air temperature regulation comprises regulating the air temperature to the specified set point, which may be accomplished through known temperature regulation systems and processes. Temperature regulation may be accomplished with, for example, a more simple thermostatic (on/off) control with hysteresis or a more sophisticated PID (proportional/integral/derivative) control algorithm.

Humidity may be regulated by 1) adding humidity when the humidity in holding cabinet 100 is below the humidity set point; and 2) decreasing humidity by introducing outside ambient air to holding cabinet 100, when the humidity in holding cabinet 100 is above the programmed set point. Thus, there may be at least two separate systems to regulate the humidity: a humidity generation system, and a venting system. Airflow may be regulated by 1) adjusting the speed of fan or blower 157, and 2) opening and closing vents in the venting system to permit entry of outside ambient air into holding cabinet 100 and escape of interior air from holding cabinet 100. When fan or blower 157 is activated, air from outside the cabinet may be injected into holding cabinet 100, for the most part, preventing the humidity in holding cabinet 100 from exceeding a predetermined level. Thus, according to an exemplary embodiment, humidity control comprises three states: Idle, Increase Humidity, and Decrease Humidity.

In particular configurations, a memory may store a plurality of set point values, each of which may correspond to a predetermined range, within which at least one of the temperature, the humidity, and the airflow rate in the holding cabinet is to be maintained. In some configurations, each set point value, and each predetermined range corresponding to the set point, may be associated with a particular food product and may be associated with a timing or time period in the holding time. In this manner, the environmental conditions for different food products, having different material properties, may be maintained in a manner particularly suited for that product throughout the holding time, and thus, extends the holding time before significant degradation of that product's quality occurs. For example, one set point is associated with chicken nuggets, while another set point is associated with churros. In this manner, the system may use an appropriate set point for a particular food product to further extend the holding time for that particular food product before significant degradation of quality occurs, after the system determines the type of the particular food product held or to be held in the holding cabinet. Moreover, each food product may have a particular set of set points distributed through the duration of the holding period, which accounts for different environmental conditions desired for different times during the holding period of the particular food product.

Thus, in certain configurations, the memory stores a plurality of set point values which may be utilized at different times during the holding process. For example, one set point may be utilized for the first five minutes of holding, and another set point may be utilized for the remainder of the holding period. In still other configurations, different set points are utilized upon the occurrence of different events. For example, one set point may be utilized when the food product is initially placed in holding cabinet 100, and another set point may be utilized when a cabinet door is opened or a tray is removed.

Figure 11:
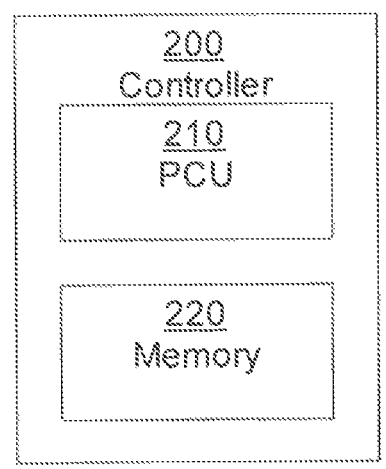
FIG. 11 is a schematic of a controller that may control operations of the holding cabinet.

Holding cabinet 100 may include a controller 200 disposed therein. In other configurations, controller 200 is external to holding cabinet 100. As shown in FIG. 11, controller 200 may include a process control unit ("PCU") 210 and a memory 220. Memory 220 may be a non-transitory memory device, examples of which may include: one or more of a solid state drive, a hard drive, a random access memory, read-only memory, or other memory device, that may store computer-readable instructions for execution by PCU 200. When PCU 200 executes the computer-readable instructions stored in memory 220, the instructions may instruct PCU 200 to control the functions of holding cabinet 100 described herein. Specifically, controller 200 may be configured to control the operations of the components of holding cabinet 100. In some configurations, each of a plurality of controllers 200 controls a different operation or component of holding cabinet 100. Controller 200 may comprise one or more PCUs 210.

Configurations of the holding cabinet may utilize a variety of humidity-generation means. For example, the holding cabinet may comprise a steam generator, which may generate humidity in the holding cabinet. Further, such a steam generator, for example, may be configured to discharge steam at various locations throughout the holding cabinet (e.g., positions along the sides of the holding cabinet, positions at the top of the holding cabinet, positions at the bottom of the holding cabinet), and steam discharge ports may be oriented to circulate steam at various angles in various directions throughout the holding cabinet. In addition, other humidity generation methods may be utilized to generate humidity in the holding cabinet.

In particular configurations, the pattern of airflow within the holding cabinet may be changed as part of the environmental control process in response to the measured temperature, humidity, and airflow rates. Such changes may be in addition to or in lieu of changing the airflow rate. For example, introductory air vents may be selectively opened and closed to change the pattern of airflow. In certain configurations, air is selectively introduced at different or varying angles in response to the measured temperature, humidity, and airflow rates, which may alter circulation patterns, humidity gradients, and temperature gradients throughout the holding cabinet. In some configurations, air is selectively introduced in different directions (e.g., horizontal, vertical) and from different sides (e.g., top, bottom, right, left, back, front) of the holding cabinet, which also may alter circulation patterns, humidity gradients, and temperature gradients throughout the holding cabinet. In addition, similar patterns of humidity introduction (e.g., through steam jets) also may be utilized, alone or in combination, with such airflow patterns.

In some configurations, the holding cabinet comprises a plurality of zones (e.g., a multi-zone holding cabinet) for storing a plurality of different food products. For example, each zone of the plurality of zones may have its own set point value, and each of the temperature, the airflow rate, and the humidity may be regulated independently in each zone. Such zones may be defined, for example, by one or more holding compartments within the holding cabinet, and each holding compartment may be separated by a wall (e.g., a solid wall, a porous wall). Further, each holding compartment may comprise its own temperature sensor, humidity sensor, and airflow sensor, as well as its own heater, fan, and humidity generator, so that the environmental control process may be performed separately for each holding compartment. Alternatively, a holding compartment shares at least one of the sensors and/or at least one of the heater, fan, and humidity generator with at least one of the other holding compartments. In other configurations, such zones are defined, for example, by one or more virtual cabinets within the holding cabinet, which may each be a particular region within the holding cabinet (e.g., an upper region, a middle region, a lower region). Such virtual cabinets may not be physically separated from each other but may each comprise its own temperature sensor, humidity sensor, and airflow sensor, as well as its own heater, fan, and humidity generator, so that the environmental control process may be performed separately for each virtual cabinet. In certain configurations, such virtual cabinets may not each comprise its own heater, fan, and humidity generator, and one or more of air, heat, and humidity is introduced into each virtual cabinet by appropriately directing the one or more of air (e.g., air vents, which can be selectively opened and closed, angled in different directions to direct air to different zones within the holding cabinet), heat (e.g., creating zones requiring warmer temperatures near a heater at the top of the holding cabinet; disposing thermal masses in each zone to retain heat), and humidity (e.g., steam vents, which are selectively opened and closed, angled in different directions to direct humidifying steam to different zones within the holding cabinet).

An advantage of the above-described holding cabinet is its flexibility in optimizing holding time for different product types. For example, if a food product requires both low airflow and high temperatures, then the convection heat system may be disabled, or run at very low power, and the food product may be heated by the conduction and radiant heat systems. The humidity can be regulated to any desired setpoint, since the steam may be injected directly into the holding area and may not rely on the convection heat fan for distribution. This differs from existing holding cabinets which generate steam by heating a large volume of water in a reservoir in the bottom of the holding compartment. This method suffers from the disadvantages that 1) it is difficult to regulate low humidities in the holding compartment, since some steam always evaporates from the reservoir and 2) relatively high airflow is necessary to equally distribute the steam through the holding compartment.

Some operating conditions result in excess humidity in the holding compartment. For example, if a large quantity of food product is loaded into the holding compartment, the water vapor emitted by the food product will increase the humidity. If the resulting humidity is too high, the convection heat system fan and vent may be operated to remove some humid air from the holding compartment and replace it with less humid air from outside the holding compartment. Some food products may require relatively low holding temperatures and high humidities. This environment is easily created in the cabinet by operating only the convection heat system and steam generation system.

The holding cabinet according to embodiments of the invention has the ability to vary the holding environment parameters over the holding time. This is important because the properties of the held food will change during holding. A particular set of environment parameters that give optimum results during the first twenty minutes may cause poor product quality if maintained beyond that time.

For example, a fried food product may enter the cabinet at a high temperature. The meat portion of the food product is moist, and the outer breading is neither too crisp nor too moist. Optimal settings for temperature and humidity to hold the food product for twenty to thirty minutes may be determined by product testing. If the food product is held at the same settings beyond that time, then too much water from the meat portion may travel through the breading layer. This causes the meat to dry out and cool, and the breading layer to become too crisp or tough.

Embodiments of the invention provide the capability to program the PCU to change the environment parameter setpoints as a function of the hold time. For example, for a fried food product it may be appropriate to gradually increase the humidity and decrease the airflow as the hold time elapses. Both of these changes reduce evaporation from the food product, and thus keep the meat portion moist and the breading at the desired crispness. Since the environment parameters may be regulated independently, they may all be changed over the hold time to control the product characteristics. Accordingly, a dynamic holding environment is provided to achieve proper environmental conditions throughout the holding time according to the food product being held.

A holding cabinet may implement hold timers. The operator may manually start the timer when the product tray is loaded. A display on the PCU may show the remaining hold time. When the hold time elapses, the PCU may emit a visual and/or audible alert to inform the operator that the hold time is expired and the product is no longer suitable for serving and should be discarded.

According to some embodiments of the invention, a holding cabinet implements a system to automatically detect when the operator loads a product tray, and may further automatically detect the type of food product and select regulation setpoints for the environment parameters.

A variety of methods may be used to detect that the product tray is loaded, and further identify the type of product. Detection methods described below include mechanical, optical, radio frequency (RF), and image recognition. Regardless of the detection method, the PCU may identify the product type when the tray is inserted and execute two actions in response. First, the hold timer for the tray may be started. Second, the PCU may begin regulating the environment parameter setpoints for that particular product type, as described above with respect to variable environment parameter regulation during holding. This regulation accounts for the fact that the environment parameters change over the holding time and the product trays may be randomly loaded and unloaded. Further, isolated holding chambers may be provided for each product tray.

According to mechanical detection, the product tray may be mechanically configured with notches, dimples, or detents which encode the product type. For example, three notch locations can be used to encode eight product types by the presence or absence of a notch. The notches may be read by microswitches or other methods known in the art.

According to optical detection, the product tray may be tagged with a label incorporating a bar code or other graphic device. The appropriate sensor, for example a bar code reader, may be connected to the PCU, which detects the product type accordingly.

According to RF detection, the product tray may be tagged with a radio frequency identification device (RFID), known in the art. The PCU may be connected to an RFID reader that reads the RFID to detect product tray presence, as well as the product type.

According to image recognition detection, the cabinet may be equipped with one or more cameras aimed at the product tray area. The PCU may use the images from the cameras and appropriate image processing to detect that a tray has been inserted, and to identify the food product type from image characteristics such as geometry and color. For example, a tray of one food product can be distinguished from a tray of a different food product by identifying the size and shape of the individual food product pieces. The camera may operate in visible or infrared wavelengths.

Although particular configurations disclosed above may utilize a free-standing holding cabinet, other holding cabinets may be utilized. For example, the systems and methods disclosed herein may be incorporated into a portable merchandiser (e.g., a pizza delivery container, another container for holding food to be delivered). Accordingly, such a portable merchandiser can be configured to perform the environmental control process and extend the holding period of "to-be-delivered" food products before the quality of such food products begins to degrade. Other types of holding containers also may be utilized.

In particular configurations, the environmental process, which may be controlled by controller 200, utilizes at least one set point value corresponding to the type of food product held in holding cabinet 100, as well as the holding time. Specifically, controller 200 may determine the type of product held in holding cabinet 100 and a timer may be used to determine the holding time. For example, controller 200 may make this determination based on a reading from a detector. Thereafter, controller 200 may select a predetermined set point value, which is stored in a memory, such as memory 220, for the determined type of food product held in holding cabinet 100. In particular configurations, the selected predetermined set point value corresponds to a value of one or more of temperature, humidity, and airflow rate, alone or in combination, which has been determined to extend the holding time of the determined type of food product before its quality degrades significantly as compared to other such values of the one or more of temperature, humidity, and airflow rate, alone or in combination. In addition, the set point may correspond to particular ranges about the one or more of temperature, humidity, and airflow rate, which have been determined to extend the holding time of the determined type of food product before its quality degrades significantly as compared to other such values of the one or more of temperature, humidity, and airflow rate, alone or in combination. In certain configurations, the set point is selected without determining a product load (e.g., the amount of the food product to be held in holding cabinet 100).

Thereafter, the holding process may start. During the holding process, humidity sensor 304 may measure the humidity of the air in holding cabinet 100, air temperature sensor 302 may measure the temperature of the air in holding cabinet 100, and airflow sensor 306 may measure the airflow rate of the air in holding cabinet 100. As indicated above, these measurements may be performed in any order, or even concurrently, and certain of the measurements may be omitted in some configurations. Humidity sensor 304, air temperature sensor 302, and airflow sensor 306 can be configured to transmit the measured values of humidity, temperature, and airflow rate, respectively, to controller 200.

Thereafter, controller 200 may compare the measured values of humidity, temperature, and airflow rate with the respective values or ranges of humidity, temperature, and airflow rate corresponding to the selected set point value. For example, when it is determined that the measured humidity is greater than the humidity value (or the upper limit of the humidity range, when ranges are provided) corresponding to the selected set point or that the measured temperature is greater than the temperature value (or the upper limit of the temperature range, when ranges are provided) corresponding to the selected set point, controller 200 may control the heaters, steam generator, and vents to regulate accordingly. Conversely, for example, when it is determined that the measured humidity is less than or equal to the humidity value (or the lower limit of the humidity range, when ranges are provided) corresponding to the selected set point or that the measured temperature is less than or equal to the temperature value (or the lower limit of the temperature range, when ranges are provided) corresponding to the selected set point, controller 200 may control the heaters steam generator, and vents to regulate accordingly. Further, controller 200 may change one or more of the frequency and duration (e.g., the duty cycle) of activating and deactivating the heaters, steam generator, and vents based on the deviation of the measured values from the values (or range limits) corresponding to the set point value.

In addition, controller 200 may selectively control fan or blower 157, such that the airflow rate in holding cabinet 100 is selectively changed based on a result of the comparisons. For example, when it is determined that the measured temperature is greater than the temperature value (or the upper limit of the temperature range, when ranges are provided) corresponding to the selected set point or that the measured airflow rate is less than the airflow rate (or the lower limit of the airflow rate range, when ranges are provided) corresponding to the selected set point, controller 200 can be configured to activate fan or blower 157 or increase the speed of fan or blower 157 in proportion to the deviation of the measured values from the values (or range limits) corresponding to the set point value. Conversely, for example, when it is determined that the measured temperature is less than or equal to the temperature value (or the lower limit of the temperature range, when ranges are provided) corresponding to the selected set point or that the measured airflow rate is greater than the airflow rate (or the upper limit of the airflow rate range, when ranges are provided) corresponding to the selected set point, controller 200 can be configured to deactivate fan or blower 157 or decrease the speed of fan or blower 157 in proportion to the deviation of the measured values from the values (or range limits) corresponding to the set point value. Further, controller 200 may change one or more of the frequency and duration (e.g., the duty cycle) of activating and deactivating fan or blower 157 based on the deviation of the measured values from the values (or range limits) corresponding to the set point value.

Further, for example, when it is determined that the measured temperature is greater than the temperature value (or the upper limit of the temperature range, when ranges are provided) corresponding to the selected set point or that the measured airflow rate is less than the airflow rate (or the upper limit of the airflow rate range, when ranges are provided) corresponding to the selected set point, controller 200 can be configured to control one or more of the heaters to deactivate or to generate less heat. Conversely, for example, when it is determined that the measured temperature is less than or equal to the temperature value (or the lower limit of the temperature range, when ranges are provided) corresponding to the selected set point or that the measured airflow rate is greater than the airflow rate (or the upper limit of the airflow rate range, when ranges are provided) corresponding to the selected set point, controller 200 can be configured to control one or more of the heaters to activate or to generate more heat. The amount of heat generated by the heaters may be proportional to the deviation of the measured values from the values (or range limits) corresponding to the set point value, and may be further informed by the measured airflow rate (e.g., when the measured airflow rate is high, there may be more convective cooling of the product and the vents may not need to be opened as far to reduce the temperature). Further, controller 200 may change one or more of the frequency and duration (e.g., the duty cycle) of activation of one or more of the heaters based on the deviation of the measured values from the values (or range limits) corresponding to the set point value.

Controller 200 may also determine whether the holding process is complete. When controller 200 determines that the holding process is not complete (e.g., when there is no indication that the holding process is complete), the environmental control process continues. In this manner, controller 200 may implement a feedback loop that controls the environmental conditions within holding cabinet 100 by periodically monitoring the humidity of air in holding cabinet 100, the temperature of air in holding cabinet 100, and the airflow rate in holding cabinet 100, which helps to maintain or reduce the degradation of the quality of the held product over an extended period of time. When controller 200 determines that the holding process is complete, controller 200 may end the holding process and the environmental control process may end.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A holding cabinet, comprising:
   a body defining a holding space;
   a holding compartment disposed within the holding space and configured to hold a product therein;
   a heating source comprising one or more of: a radiant heater disposed above the holding compartment, a conduction heater disposed below the holding compartment, and a convection heater disposed at an end of the holding compartment;
   a steam generator in atmospheric communication with the holding compartment and configured to generate steam;
   a temperature sensor disposed adjacent to the holding compartment and configured to measure an air temperature of the holding compartment;
   a humidity sensor disposed adjacent to the holding compartment and configured to measure a relative humidity of the holding compartment;
   a product detector configured to detect that a product is loaded in the holding compartment and to identify a type of the product;
   a fan disposed adjacent to the heating source;
   an airflow sensor disposed within the holding space and configured to measure a rate of airflow; and
   a controller configured to regulate environmental conditions of the holding compartment according to a determined setpoint, which corresponds to a predetermined temperature and relative humidity, by:
   acquiring the air temperature sensed by the temperature sensor, the relative humidity sensed by the humidity sensor, and the type of product detected by the product detector;
   selectively activating and deactivating one or more of the radiant heater, the conduction heater, the convection heater, and the steam generator in accordance with the acquired air temperature, the acquired relative humidity, and the determined setpoint corresponding to the type of product detected and a holding time of the product, to maintain the air temperature and the relative humidity of the holding compartment within a predetermined range based on the determined setpoint;
   selectively activating and deactivating the fan in accordance with the measured rate of airflow, the acquired air temperature, the acquired relative humidity, and the determined setpoint corresponding to the type of product detected and a holding time of the product, to maintain the airflow, the air temperature, and the relative humidity of the holding compartment within a predetermined range based on the determined setpoint; and
   selectively adjusting a pattern of the airflow within the holding compartment, such that air is selectively introduced within the holding compartment at different angles in accordance with the acquired air temperature, the acquired relative humidity, and the measured rate of airflow,
   wherein selectively adjusting the pattern of the airflow within the holding compartment, such that air is selectively introduced within the holding compartment at different angles comprises selectively introducing air into the holding compartment from different directions by selectively opening and closing a plurality of vents.

2. The holding cabinet according to claim 1, wherein the controller is configured to activate a hold timer that measures the holding time and begin to regulate environmental conditions of the holding compartment in response to the product detector detecting that a product is loaded in the holding compartment.

3. The holding cabinet according to claim 1, further comprising:
a product tray configured to hold product therein,
wherein the holding compartment is configured to hold the product tray.

4. The holding cabinet according to claim 3, wherein the holding compartment is configured to hold one or more product trays and each of the respective one or more product trays has a corresponding conductive heater and radiant heater.

5. The holding cabinet according to claim 3, wherein the holding cabinet comprises a plurality of the holding compartments and each of the respective plurality of the holding compartments are configured to hold one of the product trays.

6. The holding cabinet according to claim 1, further comprising:
a door configured to open and close to allow access to the holding compartment; and
a switch adjacent to the door configured to be activated and deactivated when the door is opened and closed,
wherein the controller is configured to detect when the door is open and closed based on the switch, and to activate the heating source and the steam generator to maintain the air temperature and the relative humidity at the determined setpoint.

7. The holding cabinet according to claim 1, wherein the controller is configured to regulate environmental conditions of the holding compartment according to a plurality of the determined setpoints, each of the plurality of the determined setpoints corresponding to the predetermined temperature and relative humidity at a respective time during the holding time.

8. The holding cabinet according to claim 1, wherein the product detector comprises an image capture device configured to capture an image and the controller is configured to detect that the product is loaded in the holding compartment and to identify the type of the product based on the captured image.

9. The holding cabinet according to claim 3, wherein the product detector comprises one or more of:
a mechanical detection mechanism disposed on the product tray,
an optical detection mechanism disposed on the product tray, and
a radio frequency identification device disposed on the product tray,
wherein the controller is configured to detect that the product is loaded in the holding compartment and to identify the type of the product based on a reading from the one or more of the mechanical detection mechanism, the optical detection mechanism, and the radio frequency identification device.

10. A method for regulating environmental conditions of a holding cabinet, comprising:
sensing an air temperature in the holding cabinet with a temperature sensor;
sensing a relative humidity in the holding cabinet with a humidity sensor;
detecting a type of product in the holding cabinet with a product detector;
according to a determined setpoint, which corresponds to a predetermined temperature and relative humidity, selectively activating and deactivating one or more of a radiant heater, a conduction heater, a convection heater, and a steam generator in accordance with the sensed air temperature, the sensed relative humidity, and the determined setpoint corresponding to the type of product detected and a holding time of the product, to maintain the air temperature and the relative humidity within a predetermined range based on the determined setpoint;
selectively activating and deactivating a fan in accordance with a rate of airflow measured by an airflow sensor, the sensed air temperature, the sensed relative humidity, and the setpoint corresponding to the type of product detected and a holding time of the product, to maintain the airflow, the air temperature and the relative humidity within a predetermined range based on the determined setpoint; and
selectively adjusting a pattern of the airflow within the holding compartment, such that air is selectively introduced within the holding compartment at different angles in accordance with the sensed air temperature, the sensed relative humidity, and the measured rate of airflow,
wherein selectively adjusting the pattern of the airflow within the holding compartment, such that air is selectively introduced within the holding compartment at different angles comprises selectively introducing air into the holding compartment from different directions by selectively opening and closing a plurality of vents.

11. The method according to claim 10, further comprising:
detecting that a product is loaded in the holding cabinet with the product detector; and
activating a hold timer that measures the holding time and beginning to regulate environmental conditions of the holding cabinet in response to the detecting that the product is loaded.

12. The method according to claim 10, further comprising:
detecting when a door of the holding cabinet is open and closed based on a door switch; and
activating the one or more of the radiant heater, the conduction heater, the convection heater, and the steam generator to maintain the air temperature and the relative humidity at the determined setpoint.

13. The method according to claim 10, further comprising:
regulating environmental conditions of the holding cabinet according to a plurality of the determined setpoints, each of the plurality of the determined setpoints corresponding to the predetermined temperature and relative humidity at a respective time during the holding time.

14. The method according to claim 10, further comprising:
detecting that the product is loaded in the holding compartment and identifying the type of the product based on one or more of:
an image captured by an image capture device, a reading from a mechanical detection mechanism, a reading from an optical detection mechanism, and a reading from a radio frequency identification device.

15. A computer readable program product storing instructions that, when executed by a processor, instruct the processor to perform processes comprising:
sensing an air temperature in the holding cabinet with a temperature sensor;

sensing a relative humidity in the holding cabinet with a humidity sensor;
detecting a type of product in the holding cabinet with a product detector;
according to a determined setpoint, which corresponds to a predetermined temperature and relative humidity, selectively activating and deactivating one or more of a radiant heater, a conduction heater, a convection heater, and a steam generator in accordance with the sensed air temperature, the sensed relative humidity, and the determined setpoint corresponding to the type of product detected and a holding time of the product, to maintain the air temperature and the relative humidity within a predetermined range based on the determined setpoint;
selectively activating and deactivating a fan in accordance with a rate of airflow measured by an airflow sensor, the sensed air temperature, the sensed relative humidity, and the setpoint corresponding to the type of product detected and a holding time of the product, to maintain the airflow, the air temperature and the relative humidity within a predetermined range based on the determined setpoint; and
selectively adjusting a pattern of the airflow within the holding cabinet, such that air is selectively introduced within the holding cabinet at different angles in accordance with the sensed air temperature, the sensed relative humidity, and the measured rate of airflow,
wherein selectively adjusting the pattern of the airflow within the holding compartment, such that air is selectively introduced within the holding compartment at different angles comprises selectively introducing air into the holding compartment from different directions by selectively opening and closing a plurality of vents.

16. The holding cabinet according to claim 1,
wherein the heating source comprises each of the radiant heater disposed above the holding compartment, the conduction heater disposed below the holding compartment, and the convection heater disposed at an end of the holding compartment, and
wherein selectively activating and deactivating one or more of the radiant heater, the conduction heater, the convection heater, and the steam generator comprises selectively activating and deactivating each of the radiant heater, the conduction heater, the convection heater, and the steam generator in accordance with the acquired air temperature, the acquired relative humidity, and the determined setpoint corresponding to the type of product detected and the holding time of the product, to maintain the air temperature and the relative humidity of the holding compartment within the predetermined range based on the determined setpoint.

17. The holding cabinet according to claim 1,
wherein the controller is further configured to regulate the environmental conditions of the holding compartment according to the determined setpoint by:
selectively opening and closing the plurality of vents to adjust the pattern of the airflow in accordance with the measured rate of airflow, the acquired air temperature, the acquired relative humidity, and the determined setpoint corresponding to the type of product detected and the holding time of the product to maintain the airflow, the air temperature, and the relative humidity of the holding compartment within a predetermined range based on the determined setpoint by selectively permitting entry of outside ambient air into the holding compartment and permitting escape of interior air from the holding compartment.

18. The holding cabinet according to claim 1, further comprising:
a plurality of virtual holding compartments, each virtual holding compartment of the plurality of virtual holding compartments disposed within the holding space and configured to hold one or more product therein, each virtual holding compartment of the plurality of virtual holding compartments being in fluid communication with another virtual holding compartment of the plurality of virtual holding compartments, and the plurality of virtual holding compartments including the holding compartment; and
a venting system comprising a plurality of vents formed in the body of the holding cabinet,
wherein the controller is configured to regulate environmental conditions of the holding space by individually maintaining, for each virtual holding compartment of the plurality of virtual holding compartments, environmental conditions for such virtual holding compartment distinct from environmental conditions maintained for at least one other virtual holding compartment of the plurality of virtual holding compartments, and
wherein the controller maintains the environmental conditions for each virtual holding compartment by:
selectively opening and closing the plurality of vents in accordance with a determined rate of airflow within each virtual holding compartment, a determined air temperature within each virtual holding compartment, a determined relative humidity within each virtual holding compartment, and a respective setpoint corresponding to a type of product within each virtual holding compartment and holding time of the product within each virtual holding compartment to maintain the airflow, the air temperature, and the relative humidity of within each virtual holding compartment within a predetermined range based on the respective setpoint by selectively permitting entry of outside ambient air into each virtual holding compartment and permitting escape of interior air from each virtual holding compartment.

19. The holding cabinet according to claim 18,
wherein each virtual holding compartment is configured to store a different type of product, and
wherein each virtual holding compartment includes at least one of a respective heating source, a respective steam generator, a respective humidity sensor, and a respective temperature sensor.

20. The holding cabinet according to claim 1, wherein selectively adjusting the pattern of the airflow within the holding compartment further includes selectively introducing the air in different directions and from different sides of the holding compartment.

21. The holding cabinet according to claim 20, wherein selectively adjusting the pattern of the airflow within the holding compartment is configured to alter circulation patterns of the air, humidity gradients within the air, and temperature gradients within the air throughout the holding compartment.

* * * * *